(12) United States Patent
Kim et al.

(10) Patent No.: US 11,030,866 B2
(45) Date of Patent: Jun. 8, 2021

(54) SERVICE REQUEST METHOD AND SYSTEM USING LOCAL SERVER

(71) Applicant: HELLOFACTORY CO., LTD., Seoul (KR)

(72) Inventors: Kyungmin Kim, Seoul (KR); Hyun Jip Kim, Seoul (KR)

(73) Assignee: HELLOFACTORY CO., LTD., Seoul (KR)

( * ) Notice: Subject to any disclaimer, the term of this patent is extended or adjusted under 35 U.S.C. 154(b) by 184 days.

(21) Appl. No.: 16/236,834

(22) Filed: Dec. 31, 2018

(65) Prior Publication Data

US 2020/0126375 A1      Apr. 23, 2020

Related U.S. Application Data

(63) Continuation of application No. PCT/KR2018/013699, filed on Nov. 12, 2018.

(30) Foreign Application Priority Data

Oct. 19, 2018 (KR) .................. 10-2018-0124869
Oct. 19, 2018 (KR) .................. 10-2018-0124905

(51) Int. Cl.
  *G08B 7/06* (2006.01)
  *H04L 12/939* (2013.01)
  (Continued)

(52) U.S. Cl.
  CPC ............ *G08B 7/06* (2013.01); *G08B 3/105* (2013.01); *G08B 29/18* (2013.01); *H04L 49/552* (2013.01); *G08B 3/1016* (2013.01); *G08B 3/1041* (2013.01)

(58) Field of Classification Search
  CPC ..... H04L 12/64; H04L 12/6418; H04L 12/66; H04L 12/5601; H04L 12/46;
  (Continued)

(56) References Cited

U.S. PATENT DOCUMENTS

| | | | |
|---|---|---|---|
| 2013/0246299 A1* | 9/2013 | Lovegreen | G06Q 30/06 705/346 |
| 2015/0213532 A1* | 7/2015 | Riihola | G06Q 30/0613 705/26.41 |
| 2019/0342109 A1* | 11/2019 | Kim | H04L 12/1845 |

FOREIGN PATENT DOCUMENTS

KR      10-1835832      2/2018

* cited by examiner

*Primary Examiner* — Jae Y Lee
*Assistant Examiner* — Aixa A Guadalupe Cruz
(74) *Attorney, Agent, or Firm* — Ladas & Parry, LLP

(57) ABSTRACT

A service request system comprises: a call bell device transmitting service request information in response to a customer's input; a first gateway device receiving the service request information through a local area communication; a service server connected to the first gateway device over an Internet and, in an online status, receiving the service request information from the first gateway device through the Internet; a staff terminal connected to the service server over the Internet and receiving the service request information from the service server through the Internet; a local server connected to the first gateway device and the staff terminal over the local area communication, monitoring availability of the Internet and, in an offline state, receiving the service request information of the call bell device from the first gateway device and transmitting the service request information of the call bell device to the staff terminal through the local area communication.

15 Claims, 4 Drawing Sheets

(51) Int. Cl.
  *G08B 29/18* (2006.01)
  *G08B 3/10* (2006.01)
(58) Field of Classification Search
  CPC .............. H04L 12/462; H04L 12/4625; H04L 2012/5618; H04L 29/06; H04L 29/06326; H04L 29/06027; H04L 65/00; H04L 49/101; H04L 49/25; H04L 45/02; H04L 45/04; H04L 45/10; H04W 40/26; G08B 3/1016; G08B 3/1041; G08B 3/105
  See application file for complete search history.

SERVICE REQUEST METHOD AND SYSTEM USING LOCAL SERVER

CROSS-REFERENCE TO RELATED APPLICATIONS

This application is a continuation of International Application No. PCT/KR2018/013699 filed on Nov. 12, 2018 claiming the priority to Korean Patent Application No. 10-2018-0124869, filed on Oct. 19, 2018, and Korean Patent Application No. 10-2018-0124905, filed on Oct. 19, 2018, which are incorporated herein by reference in their entireties.

TECHNICAL FIELD

Some embodiments of the present disclosure relate to a service request method and system, and more particularly, to a service request method and system which may manage information or requests received from one or more call bell devices using a local server connected to a local area communication when an Internet communication with a service server is unavailable.

RELATED ART

A call bell can be used to call an employee or a manager at a place such as a restaurant, a hospital, a hotel, and the like, or to request a service.

However, a conventional method of calling a staff at a store may have disadvantages that the service is carried out through various stages because the call bell simply transmits only a call signal without notifying a reason of the call.

An example of a service request system is disclosed in Korean Patent No. 10-1835832, registered on Feb. 28, 2018, which is incorporated herein by reference in its entirety.

SUMMARY

Various embodiments of the present disclosure provide a service request method and system, which may provide a call service without interruption even in an offline state by including a local server that can directly transmit service request information of call bell devices to a staff terminal through a local area wireless communication instead of a service server connected to the call bell devices and the staff terminal over the Internet communication network.

According to an aspect of the present disclosure, there is provided a service request method of a service request system, including: online service steps of transmitting, by a first gateway device that has received call information of a call bell device through a local area communication, the call information to a service server through the Internet, and transmitting, by the service server, the call information to a staff terminal in charge of a table in a store corresponding to the call information, so that a staff in charge provides a service corresponding to a call request of the table; and offline service steps of receiving, by the local server, the call information of the call bell devices from the first gateway device, and if the Internet connection is down by checking the Internet connection of the first gateway device by the local server, transmitting the call information to the staff terminal in charge of the table or the store terminal based on the received call information, so that the staff in charge provides the service corresponding to the call request of the table.

According to another aspect of the present disclosure, there is provided a service request system which includes a first gateway device configured to receive service request information of a call bell device through a local area wireless communication, a service server configured to receive the service request information from the first gateway device through an Internet communication network via a router, and a staff terminal in a store configured to receive the service request information of the call bell device from the service server through the Internet communication network, the service request system further including: a local server configured to receive the service request information of the call bell device from the first gateway device, and if a communication connection is down while monitoring the connection of the Internet communication network of the first gateway device, transmit the service request information of the call bell device received from the first gateway device to the staff terminal connected therewith through the local area wireless communication.

According to some embodiments of the present disclosure, the service request system may further include the local server to provide a service without interruption so that a basic service scenario can be performed even in a situation in which an external network connection is down. When the Internet connection is normally available, call information of the call bell device can be transmitted to the external or outside service server (for example, a cloud service server) through the Internet, and the call information can be transmitted to the staff terminal by the service server to provide the call service. Meanwhile, when the Internet connection is down, the call information of the call bell device can be processed by the local server to be transmitted to the staff terminal in charge, such that it is possible to provide the call service without interruption not only in a state in which the Internet connection is normally available but also in a state in which the Internet connection is down.

DETAILED DESCRIPTION OF EMBODIMENTS

A service request method of a service request system may include: online service steps of transmitting, by a first gateway device that has received call information of a call bell device through a local area communication, the call information to a service server through the Internet, and transmitting, by the service server, the call information to a staff terminal in charge of a table in a store corresponding to the call information, so that a staff in charge provides a service corresponding to a call request of the table; and offline service steps of receiving, by the local server, the call information of the call bell devices from the first gateway device, and if the Internet connection is down by checking the Internet connection of the first gateway device by the local server, transmitting the call information to the staff terminal in charge of the table or the store terminal based on the received call information, so that the staff in charge provides the service corresponding to the call request of the table.

The service request method may further include: history information synchronization steps of storing, by the local server, the service information corresponding to the call information processed in the offline service step, and when the Internet connection is restored, transmitting, by the local server, the service information to the service server, so that history information on the call service is integrally managed in the service server.

A service request system for implementing the above-described service request method may include a first gateway device configured to receive service request information of a call bell device through a local area wireless communication, a service server configured to receive the service request information from the first gateway device through an Internet communication network via a router, and a staff terminal in a store configured to receive the service request information of the call bell device from the service server through the Internet communication network The service request system may further include: a local server configured to receive the service request information of the call bell device from the first gateway device, and if a communication connection is down while monitoring the connection of the Internet communication network of the first gateway device, transmit the service request information of the call bell device received from the first gateway device to the staff terminal connected therewith through the local area wireless communication.

The local server may include a storage unit configured to store the service request information to be directly transmitted to the staff terminal and processing information to be fed back thereto through the local area wireless communication in an offline state, and when restoring to an online state, transmits the service request information and feedback processing information to the service server which is a cloud service server by communicating therewith.

The local server may periodically communicate with the cloud service server to perform environment setting in the store and updating the same to maintain the latest operating environment.

The environment setting may include an update of information on a communication between the call bell device in the store and the staff terminal in charge corresponding to the call bell device, function buttons of the call bell device and a display thereof.

The call bell device may set a store code and table numbers, display information on call reasons, orders and requests which are set in advance therein through the display, and transmit the call information through the local area wireless communication by selecting call buttons corresponding thereto.

The call bell device may receive information on call reasons, menu information for ordering and requests, which are functions for each button to be displayed, from the service server or the local server, then set and update the received information.

According to some embodiments of the present disclosure, a method of managing a service request by a service request system comprising a first gateway device and one or more staff terminals connected to a service server over an Internet communication network and connected to a local server over a local area communication and one or more call bell devices connected to the first gateway device over the local area communication and configured to transmit call information in response to a customer's input, the method may comprise: receiving, by the first gateway device, call information from the one or more call bell devices through the local area communication; checking, by the local server, availability of the Internet communication network; in an online state that the Internet communication network is available, transmitting, by the first gateway device, the call information to the service server through the Internet communication network, and transmitting, by the service server, the call information to the one or more staff terminals corresponding to a table included in the call information through the Internet communication network; and in an offline state that the Internet communication network is unavailable, receiving, by the local server, the call information of the one or more call bell devices from the first gateway device through the local area communication, and transmitting, by the local server, the call information to the one or more staff terminals corresponding to the table included in the call information or a store terminal through the local area communication.

The service request method may further comprise: in the offline status, storing, by the local server, service information corresponding to the call information processed in the offline status; and in the online status, transmitting, by the local server, the stored service information to the service server, so that history information on call services is managed by the service server in the online status.

The service request method may further comprise transmitting, by the service server or the local server, a response signal for indicating reception of the call information at the one or more staff terminals back to the one or more call bell devices so as to be displayed on the one or more call bell devices.

The service request method may further comprise periodically communicating, by the service server, with the local server to perform configuration setting of the service request system of a store and updating the configuration setting with a latest operating configuration.

Each of the one or more call bell devices may have a preset store code and a table number, display information on call reasons, orders and requests, which are set in advance, through a display, and transmit the call information through the local area communication in response to one or more call buttons, included in the one or more call bell devices, selected by the customer.

The service request method may further comprise receiving, by the one or more call bell devices, information on call reasons and requests, which correspond to each button to be displayed one the one or more call bell devices and updating, by the one or more call bell devices, with the received information on call reasons and requests.

The service request method may further comprise: receiving, by an offline-dedicated second gateway device, the call information from the one or more call bell devices through the local area communication and transmitting, by the offline-dedicated second gate device, the call information to the local server; and checking, by the local server, the availability of the Internet communication network; and when the Internet communication network is unavailable, communicating, by the local server, with the one or more call bell devices through the second gateway device.

According to certain embodiments of the present disclosure, a service request system may comprise: one or more call bell devices configured to transmit service request information in response to a customer's input; a first gateway device configured to receive the service request information of the one or more call bell devices through a local area wireless communication; a service server connected to the first gateway device over an Internet communication network and configured to, in an online status that the Internet communication network is available, receive the service request information from the first gateway device through the Internet communication network; one or more staff terminals connected to the service server over the Internet communication network and configured to receive the service request information of the one or more call bell devices from the service server through the Internet communication network; a local server connected to the first gateway device and the one or more staff terminals over the local area wireless communication, configured to monitor availability of the Internet communication network and, in an offline state that the Internet communication network is unavailable, receive the service request information of the one or more call bell devices from the first gateway device and transmit the service request information of the one or more call bell devices received from the first gateway device to the one or more staff terminals through the local area wireless communication.

The local server may be configured to, in the offline state, store the service request information, directly transmit the service request information to the one or more staff terminals through the local area wireless communication and receive processing result information from the one or more staff terminals or the one or more call bell devices through the local area wireless communication, and in the online state, transmit the stored service request information and processing result information to the service server through the Internet communication network.

The local server may be configured to periodically communicate with the service server to perform configuration setting of the service request system of a store and updating the configuration setting with a latest configuration setting.

Each of the one or more call bell devices may have a preset store code and table number, and may be configured to display information on call reasons, orders and requests, which are set in advance, and transmit the call information through the local area wireless communication in response to one or more call buttons, included in the one or more call bell devices, selected by the customer.

The one or more call bell devices may be configured to receive information on call reasons and requests, which correspond to each button to be displayed on the one or more call bell devices, from the service server or the local server and update with the received information on call reasons and requests.

The service request system may further comprise an offline-dedicated second gateway device configured to receive the call information from the one or more call bell devices through the local area wireless communication and transmit the call information to the local server through the local area wireless communication.

The one or more call bell devices may be configured to perform a bidirectional communication and periodically update and set one or more buttons for one or more requests from the online service server or the local server, and after transmitting the call information for a service request, display a request reception state by receiving response information from the one or more staff terminals corresponding to the call information.

According to some embodiments of the present disclosure, a service request system may comprise: one or more call bell devices which are provided for each table in a store, have buttons indicating call reasons, orders and requests to be selected by a customer, and are configured to generate call information according to a table number and a button selected by the customer among the buttons; a gateway device configured to receive the call information from the one or more call bell devices and transmit the call information to a local server through a local area wireless communication in an offline status that an Internet communication network is unavailable; the local server connected to the gateway device and the one or more call bell devices over the local area wireless communication and configured to transmit the call information to a staff terminal corresponding to the table included in the call information received from the gateway device to perform a call service management; and the staff terminal configured to receive the call information from the local server and display call service information corresponding to the received call information.

An Internet online service request system using a cloud service server has an advantage that, when using the cloud service server connected through the Internet, a call service can be provided through the Internet without each store needing to prepare a call management server for each store its own. However, this system cannot provide the call service when the Internet connection is down to be in an offline state.

An Internet offline service request system using only a local server can provide a call service by connecting call devices with the local server through a local area wireless communication network in a store regardless of the Internet connection. However, the call service may be managed individually.

According to some embodiments of the present disclosure, the dual network service request system using the cloud service server and the local server may manage the call service through the online network and may provide the call service through the local server without interruption at the time of an offline state, as well as, data of call and feedback processing information at the time of the offline state are stored, and when the Internet connection is available to be an online state, the data may be transmitted to the cloud service server to be used for managing the call service.

Hereinafter, preferred embodiments according to the present invention will be described in detail with reference to the accompanying drawings. The detailed description to be described below with reference to the accompanying drawings is intended to illustrate exemplary embodiments of the invention and is not intended to represent the only embodiment in which the invention may be executed.

It should be understood that embodiments of the present invention are provided so as to make sure that the disclosure of the present invention is comprehensive, and to clarify the scope of the invention for the benefit of persons having common knowledge in the technical field to which the present invention pertains ('those skilled in the art'). However, the present invention is defined only by the scope of the appended claims.

In some cases, well-known structures and devices will not be described or will be illustrated in a block diagram form centering on core functions of each structure and apparatus, to avoid obscuring concepts of the present invention. In the entire drawings, like reference numerals in the drawings denote like elements.

In the specification, when the explanatory phrase a part "comprises or includes" a component is used, this means that the part may further include the component without excluding other components, so long as special explanation is not provided.

Further, the term " . . . unit" described in the specification means a unit for processing at least one function or operation, which may be implemented by hardware or software, or a combination thereof. In addition, as used herein the context for describing the present invention, the singular forms "a," "an," "one" and "the" are intended to include the plural forms as well, unless the context clearly indicates otherwise in the specification or is clearly limited by the context.

In addition, specific terms used in embodiments of the present invention are provided to facilitate understanding of the present invention. Unless otherwise defined, all terms including technical and scientific terms used herein have the same meaning as commonly understood by those skilled in the art. Use of such a specific term may be changed to other forms without departing from the technical spirit of the present invention.

Hereinafter, preferred embodiments according to the present invention will be described in detail with reference to the accompanying drawings. The detailed description to be described below with reference to the accompanying drawings is intended to illustrate exemplary embodiments of the invention and is not intended to represent the only embodiment in which the invention may be executed.

Figure 1:
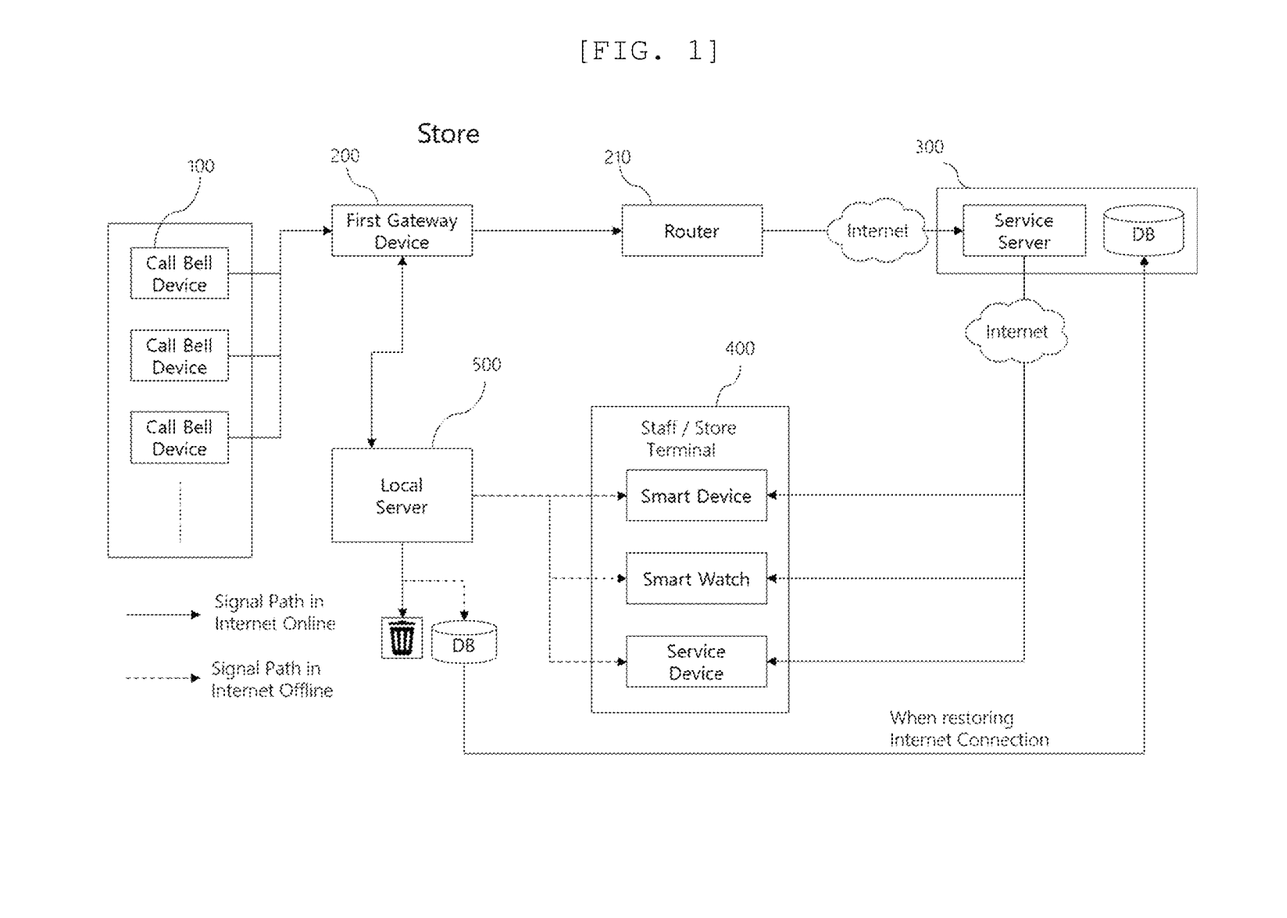
FIG. 1 is a block diagram illustrating a configuration of a service request system according to an embodiment of the present disclosure.

FIG. 1 is a block diagram illustrating a configuration of a service request system according to an embodiment of the present disclosure.

Referring to FIG. 1, the service request system may include call bell devices 100, a first gateway device 200, a service server 300, one or more staff terminals 400, and a local server 500. The call bell devices 100 may be provided for each table in a store. For example, the call bell devices may have one or more buttons to be selected for, for example, but not limited to, call reasons, orders and requests. The call bell devices 100 may be configured to generate first call information according to table numbers and functions of the buttons set therein by inputting through the buttons.

The first gateway device 200 may be configured to receive the call information from the call bell devices 100, to add a store code to the call information including a store code, and to transmit the call information or store code to a service server 300.

The service server 300 may be configured to transmit the call information received from the first gateway device 200 connected through the Internet to a staff terminal in charge of the table or a store terminal in the store to manage the call service, based on call service environments or configurations of the store which are set in advance according to the received call information. For instance, the service server 300 may provide a cloud service by accessing the Internet via a router.

One or more staff terminals 400 may be configured to receive the call information from the service server 300 and output or display call service information in response to the received the call information, respectively.

The local server 500 may be configured to receive the call information of the call bell devices 100 from the first gateway device 200. When the call information cannot be not transmitted to the service server 300 due to an interruption or problem of the Internet connection while monitoring the Internet connection of the first gateway device 200, the local server 500 may be configured to transmit the call information to the staff terminals 400 corresponding thereto according to the call information instead of the service server 300.

The staff terminal 400 may include, for example, but not limited to, any one of a smart device, a smart watch, a call service-dedicated device, and any portable device that is configured to communicate with a server. Further, in addition to the staff terminal of each individual staff, the service request system may include a store terminal (e.g., a PC or a smart terminal of the store) for integrated management of the store.

The staff terminal 400 may be configured to output or display service request information according to the received call information, receive information on confirmation from the staff in charge and a service provision result to generate feedback information, and transmit the generated feedback information to the service server 300 or the local server 500. The service server 300 or the local server 500 may manage the call information and the feedback information on the service response received from the staff terminal 400 as call service history information. When the Internet connection is restored to normal, the local server 500 may transmit the call information and the feedback information which are processed at the time of interruption of the Internet connection to the service server 300, so as to integrally manage the call service history information.

Also, according to certain embodiments of the present disclosure, the feedback information received from the staff terminal or the store terminal 400 may be fed back to the call bell devices 100 by the service server 300 and/or the local server 500, and the feedback information may be outputted or displayed on the call bell devices 100.

Further, according to some embodiments of the present disclosure, the service server 300 may set and upgrade call service environment or configuration information of the staff terminal and the store terminal 400 matched with the call bell devices 100 for each store, and may also set and upgrade the call service environment or configuration information of the local server 500.

In addition, according to certain embodiments of the present disclosure (for example, an embodiment shown in FIG. 2) may further include an offline-dedicated second gateway device 600. The offline-dedicated second gateway device 600 may be configured to receive the call information from the call bell devices 100 and transmit the received call information to the local server 500.

The call service environment or configuration information may include, for example, but not limited to, a button information setting for setting the call information (e.g. information presenting a plurality of call reasons and a plurality of pieces of orderable menu information, which are set in advance corresponding to the call buttons, and calling by selecting the same) for each button of the call bell devices, and an environment or configuration setting for setting environment or configuration information by matching with the staff terminal in charge of the table corresponding to the table number.

Figure 2:
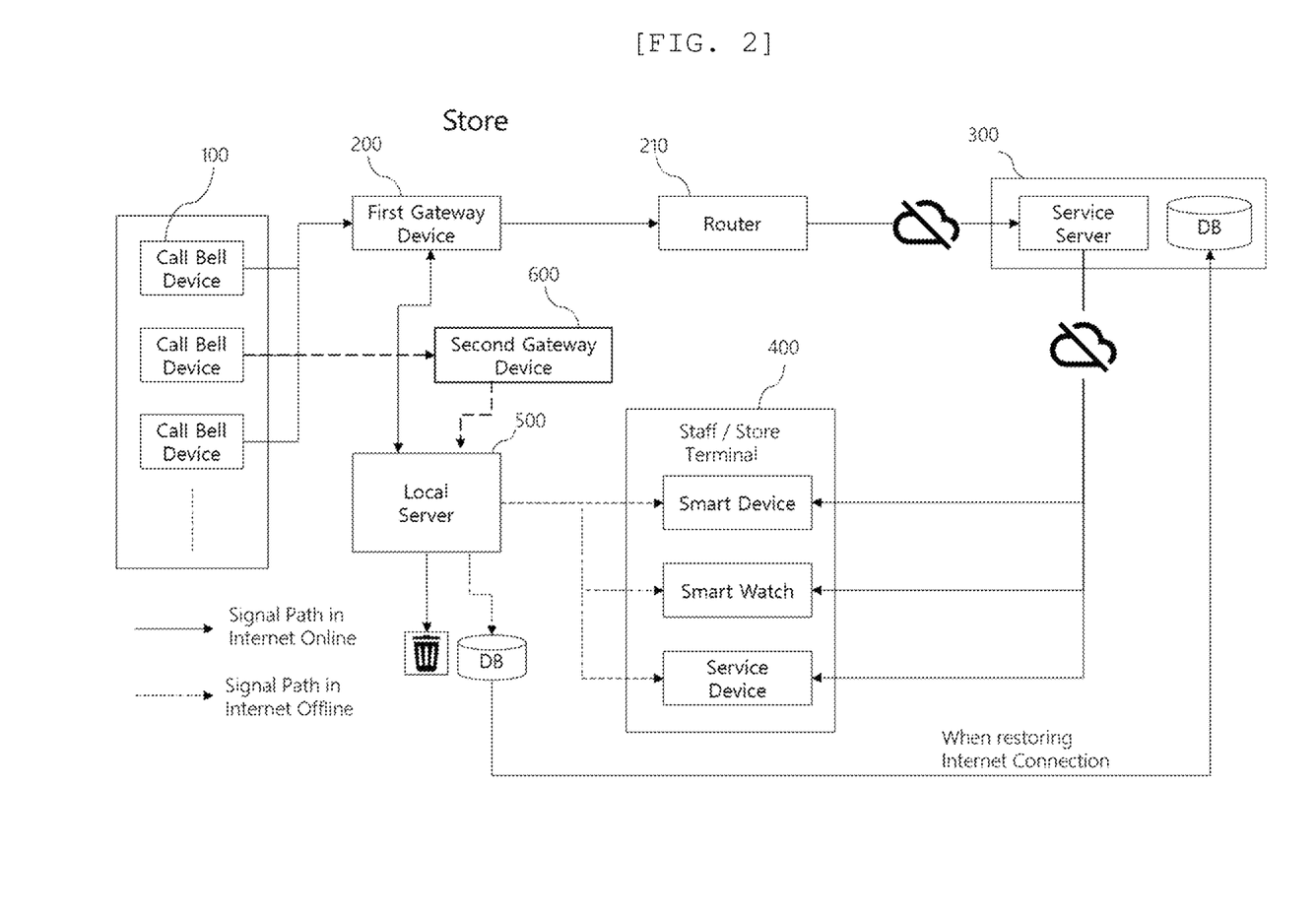
FIG. 2 is a block diagram illustrating a configuration of a service request system according to another embodiment of the present disclosure.

FIG. 2 is a block diagram illustrating a configuration of a service request system according to another embodiment of the present disclosure.

The service request system according to the present embodiment may further include an offline-dedicated second gateway device 600. The offline-dedicated second gateway device 600 may be configured to receive the call information from the call bell devices 100 through the local area communication, and transmit the received call information to the local server 500.

The call bell devices 100 may be connected to the first gateway device 200 through the local area communication, and the first gateway device 200 may be connected to the service server 300 via the router 210. For example, the service server 300 may be a cloud service server accessible through the Internet network. In addition, the service server 300 is connected to the staff terminals 400 of each store through the Internet network. Herein, the Internet network may include schemes which are connected to the Internet through a typical wired communication network or a wireless communication network.

Also, the call bell devices 100 may have only one-way transmission function, but may also be configured to have a bidirectional communication function with data transmission and reception functions. For example, the call bell devices 100 may include a function of transmitting the call information and a function of receiving feedback of the call response from the staff terminals 400 to display the call response, and may periodically upgrade virtual button environments or configurations of the call bell devices 100.

The call bell devices 100 may be basically configured to have buttons with functions set in advance therein, and display virtual buttons that can be selected and call each call function on the display. The virtual buttons may provide virtual touch buttons that can specifically represent the call reasons so that customers can select and call specific call reasons from each table, for example, "Give me water," "Give me a menu," "Take my order" and the like. It may be configured in such a way that, when the virtual button is pressed or selected, the call reason information is transmitted. These virtual buttons are basically set in advance, and it is preferable that the cloud service server 300 periodically updates the environment or configuration setting of the virtual buttons in accordance with store characteristics, based on the environment or configuration setting input through a manager computer of each store.

In addition, it is preferable to transmit the call information including the table number on which the call bell device 100 is placed, and the call information may include a store code. However, it is possible to transmit the call information by including a store identification code when transmitting it by the first gateway device 100 through the Internet.

The call information of the call bell device 100 is transmitted to the first gateway device 200 through the local area communication, and then the call information is transmitted to the service server 300 by the first gateway 200 by accessing the Internet network via the router 210.

Based on the received call information, the service server 300 extracts specific information on the store code, the table number and the call, and transmits the specific call information to the store corresponding to the store code, and to the staff terminal 400 in charge of the table corresponding to the table number.

Thereby, the call information is transmitted to the staff terminal 400 in charge of the called table, and the staff in charge may receive or grasp the call reason to provide the call service.

When receiving the call information, the staff terminal 400 may input a response feedback information for indicating reception and acceptance of the call information back to the service server 300. The service server 300 receives the response feedback information and transmit the received response feedback information to at least one of the call bell devices 100. The service server 300 may transmit a state of the call response feedback on the call bell device 100 to the staff terminal 400 to notify the staff that the call has been transmitted. For instance, the response for indicating reception of the call information may be fed back by touching the button on the staff terminal 400, and be displayed on the call bell device 100, so that the staff may confirm that the call information has been transmitted. After providing the service to a customer, the staff may bring the staff terminal 400 close to the call bell device 100 for near field communication (NFC) tag to transmit to the service server 300 information that the call service has been serviced, and the service server 300 may manage information on the call and service provision by using a database.

As described above, in the online state (for example, a state that the Internet is available), the first gateway device 200 may transmit the call information of the call bell device 100 may transmit the call information of the call bell device 100 to the service server 300 that provides the cloud service through the router 210, and the service server 300 may transmit the call information to the staff terminal 100 so as to provide the call service.

In some exemplary embodiments of the present disclosure, only when the Internet communication network is normally available, an online call service, in which the call information of the call bell device 100 is provided to the staff terminal 400 through the service server 300, may be provided.

If the router 210 in the store is not connected to the Internet network, the service server 300 cannot transmit the call information of the call bell device 100 to the staff terminal 400, and therefore a customer who pressed a call bell cannot provided with the call bell service.

Thereby, according to certain embodiments of the present disclosure may further include the local server 500.

The first gateway device 200 or the local server 500 can monitor the Internet connection. When the first gateway device 200 cannot transmit the call information to the service server 300 over the Internet, the first gateway device 200 may transmit the call information of the call bell devices 100 to the local server 500, and the local server 500 may receive the call information of the call bell device 100 from the first gateway device 200 and transmit the call information to the staff terminal 400 corresponding thereto according to the call information.

According to some embodiments of the present disclosure, the call information of the call bell device 100 may be transmitted to the service server 300 by the first gateway device 200 by accessing the Internet via the router 210, as well as the received call information is also transmitted to the local server 500. The local server 500 may determine whether the Internet connection is normally available through the first gateway device 200, and when the Internet connection is normally available, the local server 500 may delete the call information.

If the Internet connection is down, the local server 500 may process the call information received from the first gateway device 200 and transmit the processed call information to the staff terminal 400 through the local area communication.

In the processing of the call information, the local server 500 may extract the table number included in the call information as processed by the service server 300, and transmit the extracted call information to the staff terminal 400 in charge matched with the table number.

Also, in the call service, in the offline state, the staff terminal 400 may respond that the call has been received by confirming the call information reception, and the responded feedback information may be fed back to the call bell device 100 through the local server 500. The call information and the feedback information processed in the offline state are stored in the local server 500. When the Internet connection is restored, the local server 500 transmits the call information processed in the offline state and the feedback information corresponding thereto to the service server 300, then the service server 300 updates the received call information and the feedback information in the management information in the online state and stores the same in the database.

Accordingly, some embodiments of present disclosure may provide the call service through the service server 300 in the online state, and may also provide the call service through the local server 500 in the offline state. Therefore, it is possible to provide the call service using the call bell device 100 without interruption in online and offline states.

FIG. 2 is a block diagram illustrating a configuration of a service request system according to another embodiment of the present disclosure. Referring to FIG. 2, the service request system may further include the offline-dedicated second gateway device 600 illustrated in FIG. 2. The second gateway device 600 can be connected to the call bell device 100 through the local area communication, and may serve to receive the call information from the call bell device 100, transmit the received call information to the local server 500, and transmit a feedback signal through the local server 500 back to the call bell device 100.

The local server 500 may check the Internet connection of the first gateway device 200, and when the Internet connection of the first gateway device 200 is down, the local server 500 may receive the call information of the call bell device 100 through the second gateway device 600.

When the Internet connection is down, the local server 500 may analyze the call information received from the second gateway device 600 and transmit the call information, such as the call reason, to the staff terminal 400 in charge of the table corresponding to each table number. When there is a response to the call reason from the staff terminal 400, the local server 500 feeds the responded feedback information back to the call bell device 100 through the second gateway device 600 to display the call response thereon.

Also, the local server 500 may store and manage the call information and the feedback information processed at the time if the Internet connection is down. Thereafter, when the Internet connection is restored to normal, the local server 500 may transmit the stored call information and feedback information to the service server 300 through the Internet, so as to be managed as the call service history information.

A service request method of the service request system according to some embodiments of the present disclosure may include: online service steps of transmitting, by the first gateway device 200 that has received call information of the call bell device 100 through the local area communication, the call information to the service server 300 through the Internet, and transmitting, by the service server 300, the call information to the staff terminal 400 in charge of a table in the store corresponding to the call information, so that a staff in charge may provide a service corresponding to the call request of the table; and The method further comprise offline service steps of receiving, by the local server 500, the call information of the call bell devices 100 from the first gateway device 200, checking the Internet connection of the first gateway device 200 by the local server 500, and when the Internet connection is down, transmitting the call information to staff terminal 400 in charge of the table or the store terminal based on the received call information, so that the staff in charge may provide the service corresponding to the call request of the table.

The service request method may further include: history information synchronization steps of storing, by the local server 500, the service information corresponding to the call information processed in the offline service step, and when the Internet connection is restored, transmitting, by the local server, the service information to the service server 300, so that history information on the call service is integrally managed in the service server 300.

Figure 3:
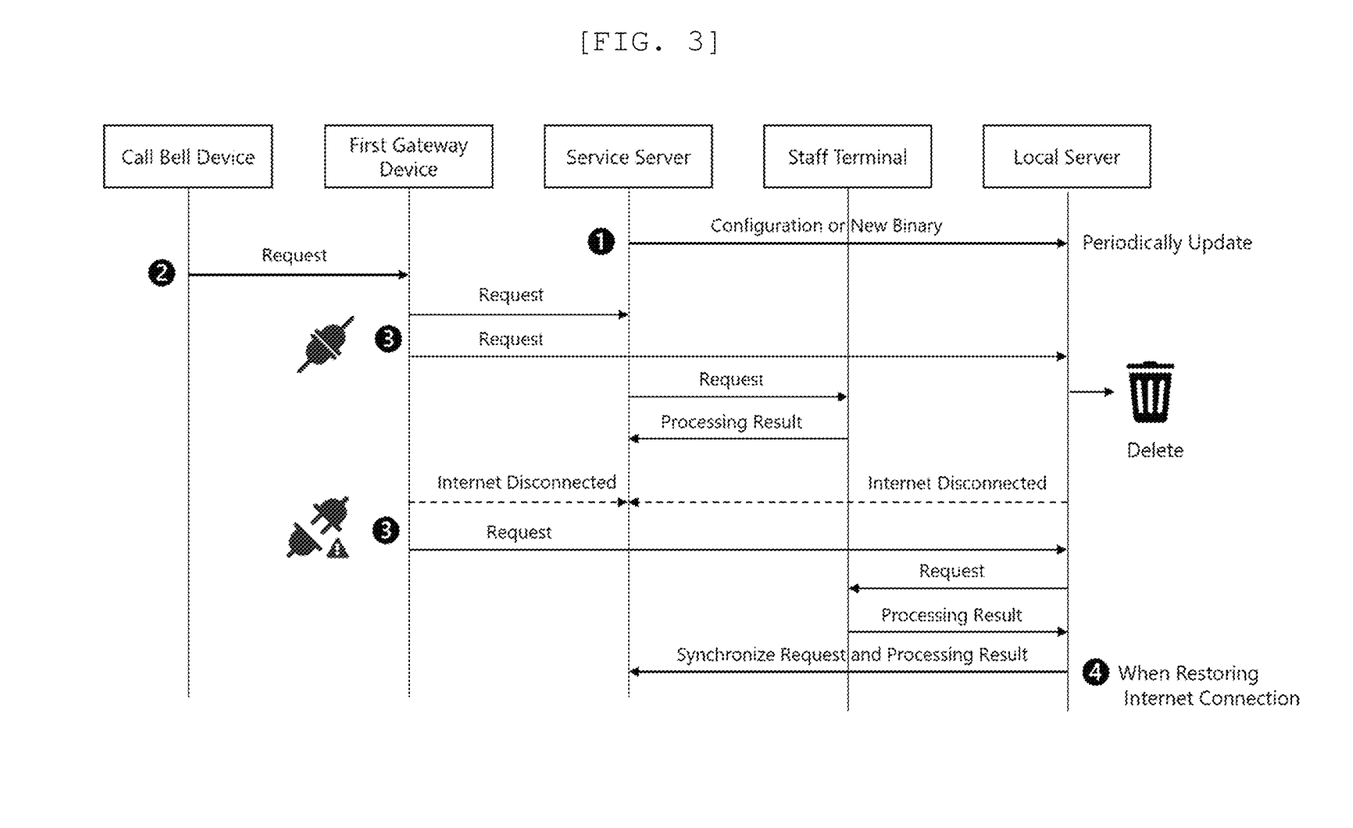
FIG. 3 is an explanatory diagram illustrating a service request method of the service request system according to the present disclosure.
Figure 4:
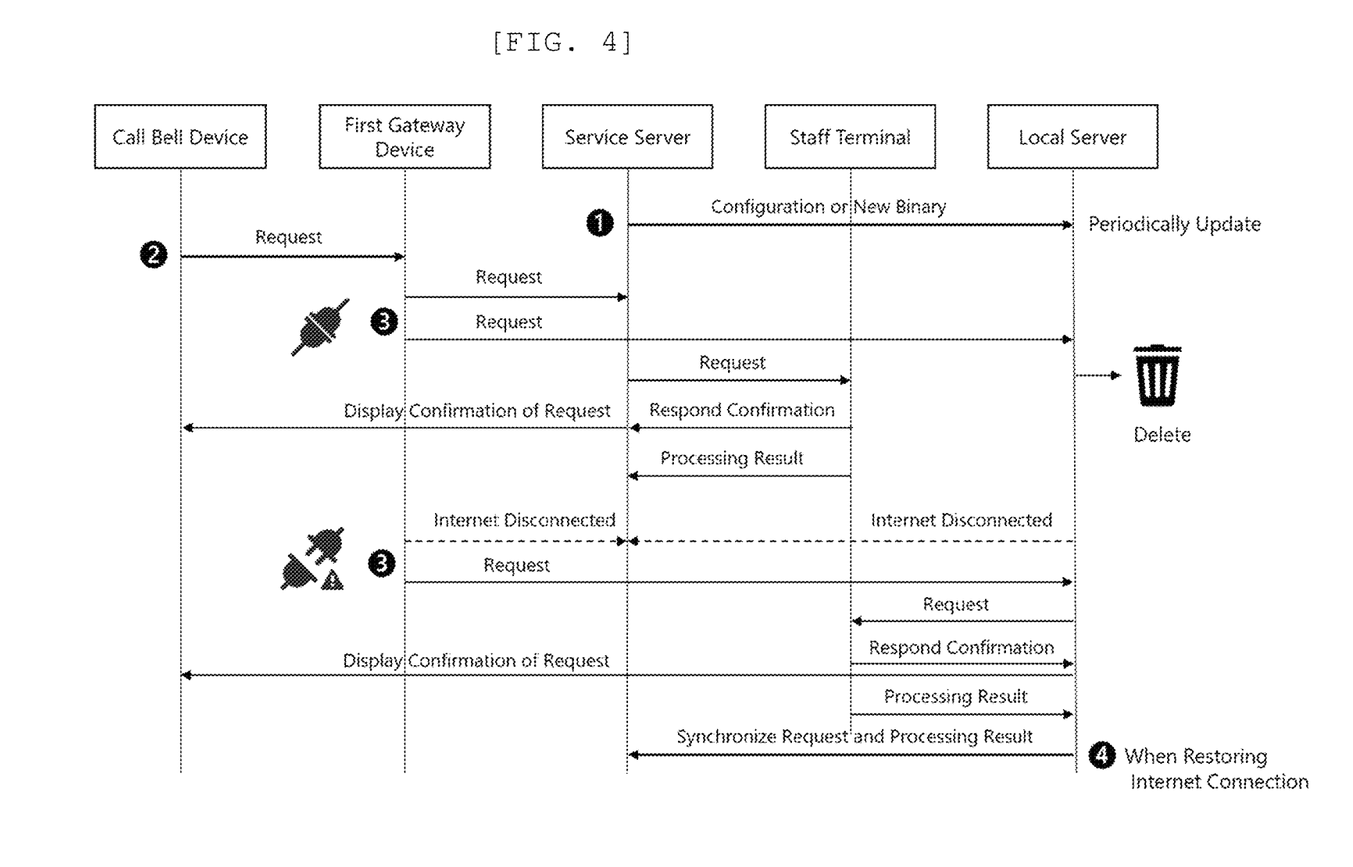
FIG. 4 is an explanatory view for describing a bidirectional communication service request method of the service request system according to an embodiment of the present disclosure.

FIG. 3 is an explanatory diagram illustrating a service request method of a service request system according to an embodiment of the present disclosure, and FIG. 4 is an explanatory view for describing a bidirectional communication service request method of a service request system according to an embodiment of the present disclosure. Herein, FIG. 3 shows a state in which data flows in only one direction, and FIG. 4 shows a state in which data flows in both directions.

As the online service step, the service server 300 may transmit store-specific environment or configuration information to the local server 500 in a normal online state to periodically update the local server 500. The environment or configuration information may include, for example, but not limited to, staff terminal matching information of a staff in charge for each table number.

When the button for the call reasons set in the call bell device 100 is pressed or selected by a customer, call information including the request may be transmitted to the first gateway device 200 through the local area communication.

The first gateway device 200 may simultaneously transmit the request according to the call information of the call bell device 100 to the service server 300 and the local server 500. The first gateway device 200 may transmit the request to the service server 300 connected thereto through the Internet communication network, and transmits the request to the local server 500 through the internal intranet or the local area communication method or network.

The service server 300 may transmit the request received from the first gateway device 200 to the staff terminal 400. At this time, the local server 500 may check the Internet connection of the first gateway device 200, and when the Internet connection of the local server 500 is normally available, the local server 500 may delete the request received from the first gateway device 200.

The staff terminal 400 that has received the request from the service server 300 may transmit information indicating that the request has been received by pressing a confirmation button or a staff provides a service corresponding to the request, and feeds tagged information obtained by tagging with the call bell device 100 back to the service server 300 as processing result information.

As the offline service step, the local server 500 may monitor the Internet connection of the first gateway 200 and/or the Internet connection between the local server 500 and the service server 300. If the Internet connection is down, the local server directly receives the request from the first gateway 200, and transmits the request to the staff terminal 400 corresponding to the received request.

The staff terminal 400 may transmit a response for indicating reception of the request and/or processing results to the local server 500 as feedback information.

The local server 500 may store the feedback information on the request processed in a state in which the Internet connection is down and the processing result, and when the Internet connection is restored, the local server 500 may transmit the information to the service server 300 and manage as the call service history.

Meanwhile, the service request system may further include an offline-dedicated second gateway device 600, and the offline service step of the service request method may further include the step of transmitting the call information of the call bell device 100 to the second gateway device 600 through the local area communication. Then, the second gateway device 600 may transmit the received call information to the local server 500, and the local server 500 may transmit the request to the staff terminal 400 through the local area communication.

The local server 500 may receive the processing result information of the staff terminal 400 as the feedback information.

As described above, in the call bell service system according to certain embodiments of the present disclosure, when the Internet connection is normally available, the call requests of the call bell device 100 may be transmitted to the staff terminal 400 through the cloud service server 300 connected to the Internet.

However, when the Internet connection is down, the connection with the cloud service server 300 may be interrupted, and the customer cannot be provided the call service. The service request system according to some embodiments of the present disclosure may include the local server 500 installed in or outside a store.

The local server 500 may receive the call information of the call bell device 100 from the first gateway device 200 and monitor whether the Internet connection is normally available or is down through the first gateway device 200. If the Internet connection is down, the request according to the call information may be transmitted to the staff terminal 400 based on the received call information so that the customer may receive the call service in the local state.

When the Internet connection is restored, the local server 500 may transmit the call information and the feedback information in a local service to the service server 300 to synchronize the call service management.

Therefore, according to various embodiments of the present disclosure, when the Internet connection is normally available, the call information may be transmitted to the cloud service server, and when the Internet connection is down, the call information may be transmitted to the local server. Accordingly, the call information can be managed regardless of the Internet connection.

Although preferred embodiments of the present disclosure that have been described using specific examples, the specification and drawings are to be regarded in an illustrative rather than a restrictive sense in order to help understand the present disclosure. Accordingly, it should be understood by those skilled in the art that various modifications and changes made based on the technical idea of various embodiments of the present invention in addition the preferred embodiments of the present disclosure disclosed herein are included in the scope of various embodiments of the present disclosure.

The invention claimed is:

1. A method of managing a service request by a service request system comprising a first gateway device and one or more staff terminals connected to a service server over an Internet communication network and connected to a local server over a local area communication and one or more call bell devices connected to the first gateway device over the local area communication and configured to transmit call information in response to a customer's input, the method comprising:
   receiving, by the first gateway device, the call information from the one or more call bell devices through the local area communication;
   checking, by the local server, whether the first gateway device is connected with the service server through the Internet communication network or is disconnected from the Internet communication network;
   in an online state that the first gateway device is connected with the service server through the Internet communication network, transmitting, by the first gateway device, the call information to the service server, with which the first gateway device is connected through the Internet communication network, through the Internet communication network, and transmitting, by the service server, the call information to the one or more staff terminals corresponding to a table included in the call information through the Internet communication network; and
   in an offline state that the first gateway device is disconnected from the Internet communication network and is unable to be connected with the service server, receiving, by the local server, the call information of the one or more call bell devices from the first gateway device through the local area communication, and transmitting, by the local server, the call information to the one or more staff terminals corresponding to the table included in the call information or a store terminal through the local area communication.

2. The service request method according to claim 1, further comprising:
   in the offline status, storing, by the local server, service information corresponding to the call information processed in the offline status; and
   in the online status, transmitting, by the local server, the stored service information to the service server, so that history information on call services is managed by the service server in the online status.

3. The service request method according to claim 1, further comprising transmitting, by the service server or the local server, a response signal for indicating reception of the call information at the one or more staff terminals back to the one or more call bell devices so as to be displayed on the one or more call bell devices.

4. The service request method according to claim 1, further comprising periodically communicating, by the service server, with the local server to perform configuration setting of the service request system of a store and updating the configuration setting with a latest operating configuration.

5. The service request method according to claim 1, wherein each of the one or more call bell devices has a preset store code and a table number, displays information on call reasons, orders and requests, which are set in advance, through a display, and transmits the call information through the local area communication in response to one or more call buttons, included in the one or more call bell devices, selected by the customer.

6. The service request method according to claim 1, further comprising receiving, by the one or more call bell devices, information on call reasons and requests, which correspond to each button to be displayed one the one or more call bell devices and updating, by the one or more call bell devices, with the received information on call reasons and requests.

7. The service request method according to claim 1, further comprising:
   receiving, by an offline-dedicated second gateway device, the call information from the one or more call bell devices through the local area communication and transmitting, by the offline-dedicated second gate device, the call information to the local server; and checking, by the local server, the availability of the Internet communication network; and when the Internet communication network is unavailable, communicating, by the local server, with the one or more call bell devices through the second gateway device.

8. A service request system comprising:
one or more call bell devices configured to transmit service request information in response to a customer's input;
a first gateway device configured to be connectable to a service server over an Internet communication network and a local server over a local area wireless communication, the first gateway device configured to receive the service request information of the one or more call bell devices through the local area wireless communication;
the service server configured to be connectable to the first gateway device and one or more staff terminals over the Internet communication network;
the one or more staff terminals connected to the service server over the Internet communication network connected to the local server over the local area wireless communication, and configured to receive the service request information of the one or more call bell devices from the service server through the Internet communication network;
the local server connected to the first gateway device and the one or more staff terminals over the local area wireless communication,
wherein:
the local server is configured to check whether the first gateway device is connected with the service server through the Internet communication network or is disconnected from the Internet communication network and, in an offline state that the first gateway device is disconnected from the Internet communication network and is unable to be connected with the service server, receive the service request information of the one or more call bell devices from the first gateway device and transmit the service request information of the one or more call bell devices received from the first gateway device to the one or more staff terminals through the local area wireless communication,
the first gateway device is configured to, in an online state that the first gateway device is connected with the service server through the Internet communication network, transmit the service request information to the service server, with which the first gateway device is connected through the Internet communication network, through the Internet communication network, and
the service server is configured to, in the online state that the first gateway device is connected with the service server through the Internet communication network, receive the service request information from the first gateway device through the Internet communication network and transmit the service request information to the one or more staff terminals corresponding to a table included in the service request information through the Internet communication network.

9. The service request system according to claim 6, wherein the local server is configured to, in the offline state, store the service request information, directly transmit the service request information to the one or more staff terminals through the local area wireless communication and receive processing result information from the one or more staff terminals or the one or more call bell devices through the local area wireless communication, and in the online state, transmit the stored service request information and processing result information to the service server through the Internet communication network.

10. The service request system according to claim 8, wherein the local server is configured to periodically communicate with the service server to perform configuration setting of the service request system of a store and updating the configuration setting with a latest configuration setting.

11. The service request system according to claim 8, wherein each of the one or more call bell devices has a preset store code and table number, and is configured to display information on call reasons, orders and requests, which are set in advance, and transmit the service request information through the local area wireless communication in response to one or more call buttons, included in the one or more call bell devices, selected by the customer.

12. The service request system according to claim 8, wherein the one or more call bell devices are configured to receive information on call reasons and requests, which correspond to each button to be displayed on the one or more call bell devices, from the service server or the local server and update with the received information on call reasons and requests.

13. The service request system according to claim 8, further comprising an offline-dedicated second gateway device configured to receive the service request information from the one or more call bell devices through the local area wireless communication and transmit the service request information to the local server through the local area wireless communication.

14. The service request system according to claim 8, wherein the one or more call bell devices are configured to perform a bidirectional communication and periodically update and set one or more buttons for one or more requests from the online service server or the local server, and after transmitting the service request information for a service request, display a request reception state by receiving response information from the one or more staff terminals corresponding to the service request information.

15. A service request system comprising:
one or more call bell devices which are provided for each table in a store, have buttons indicating call reasons, orders and requests to be selected by a customer, and are configured to generate call information according to a table number and a button selected by the customer among the buttons;
a gateway device configured to receive the call information from the one or more call bell devices;
a local server connected to the gateway device and the one or more call bell devices over a local area wireless communication; and
a staff terminal connected to the local server through the local area wireless communication and connected to the service server through the Internet communication network, the staff terminal, and configured to receive the call information and display call service information corresponding to the received call information,
wherein:
the local server is configured to check whether the gateway device is connected with the service server through the Internet communication network or is disconnected from the Internet communication network and, in an offline state that the gateway device is disconnected from the Internet communication network and is unable to be connected with the service server, receive the call information of the one or more call bell devices from the gateway device and transmit the call information of the one or more call bell devices received from the gateway device to the staff terminal through the local area wireless communication, the gateway device is configured to, in an online state that the gateway device is connected with the service server through the Internet communication network, transmit the call information to the service server, with which the gateway device is connected through the Internet communication network, through the Internet communication network, and the service server is configured to, in the online state that the gateway device is connected with the service server through the Internet communication network, receive the call information from the gateway device through the Internet communication network and transmit the call information to the staff terminal corresponding to a table included in the call information through the Internet communication network.

\* \* \* \* \*